June 17, 1947.  A. J. FLEURY  2,422,347
HOBBYHORSE
Filed July 8, 1946   2 Sheets-Sheet 1
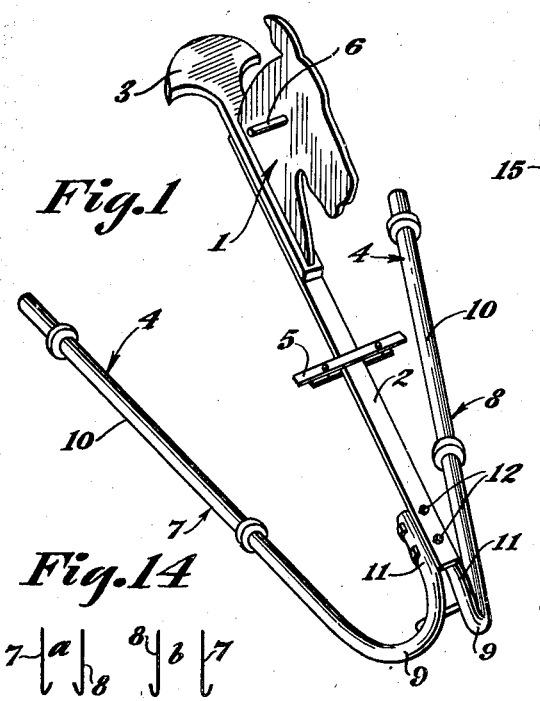
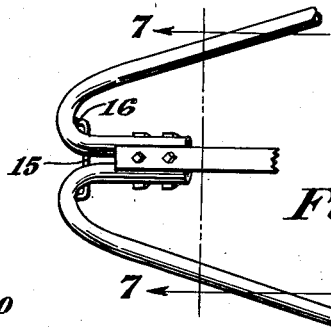
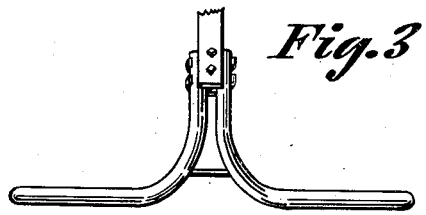
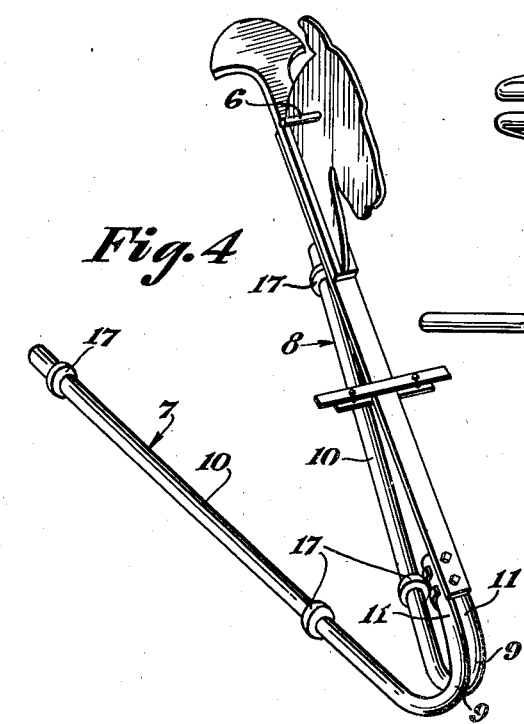
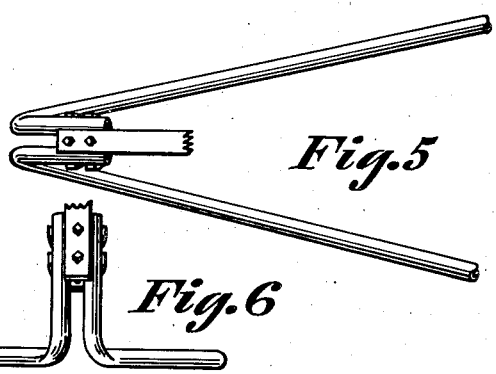
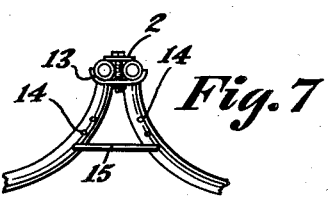
Inventor
Andrew J. Fleury
By Munn, Fenwick & Lawrence
Attorneys June 17, 1947. A. J. FLEURY 2,422,347
HOBBYHORSE
Filed July 8, 1946 2 Sheets-Sheet 2
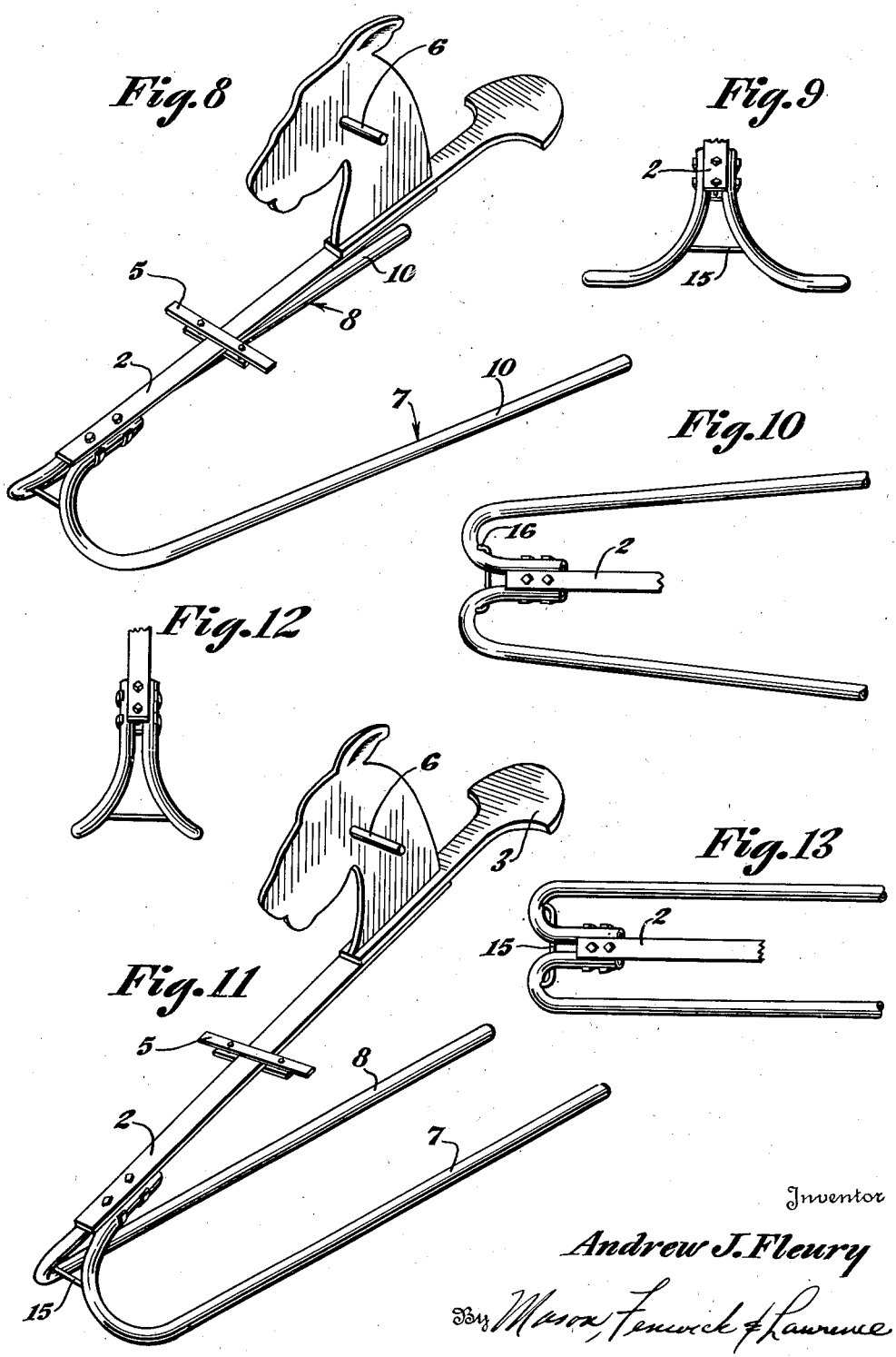
Inventor
Andrew J. Fleury
By Mason, Fenwick & Lawrence
Attorneys Patented June 17, 1947

2,422,347

UNITED STATES PATENT OFFICE 2,422,347

HOBBYHORSE

Andrew J. Fleury, High River, Alberta, Canada

Application July 8, 1946, Serial No. 682,067

6 Claims. (Cl. 272—52)

This invention relates to a "hobby horse" of that type in which the seat is mounted upon a cantilever leaf spring, the lower end of which spring is anchored to a support.

One of the objects of the invention is to provide a hobby horse adapted to be used either in fixed position or as a sled.

Another object of the invention is to provide a hobby horse of the class described, in which the width of the base of support may be varied and the height of the seat from the ground plane be simultaneously adjusted, as a function of the width adjustment of the base.

A further object of the invention is to provide a hobby horse in which the support consists of a pair of independently adjustable members with ground engaging portions that can be adjustably spaced to vary the width of the base of support, including an optimum sled forming adjustment in which the ground engaging portions are longitudinally parallel, serving as runners.

Other objects of the invention will appear as the following description of a preferred and practical embodiment thereof proceeds.

In the drawings:

Figure 1 is a perspective view of a hobby horse embodying the principles of the invention;

Figure 2 is a view in plan of the forward portion of the hobby horse;

Figure 3 is a front elevation of the forward portion;

Figure 4 is a perspective view of the same hobby horse as shown in Figure 1, adjusted to a higher seat position and narrower base of support;

Figure 5 is a plan view of the forward portion of the hobby horse as shown in Figure 4;

Figure 6 is a view in end elevation of the forward portion;

Figure 7 is a cross-section taken along the line 7—7 of Figure 2;

Figure 8 is a perspective view of the hobby horse with the supporting members reversed with respect to their side to side position;

Figure 9 is a front end elevation of the forward part of the hobby horse shown in Figure 8;

Figure 10 is a plan view of the forward portion;

Figure 11 is the same hobby horse shown in Figure 8, with the supporting members adjusted to form parallel runners;

Figure 12 is a view in end elevation of the forward part of the hobby horse shown in Figure 11;

Figure 13 is a plan view of the forward portion;

Figure 14 is a diametrical view showing alternative side by side positions of the supporting members.

Referring now in detail to the several figures and first adverting to the Figures 1 to 7, inclusive, the numeral 1 applies to the hobby horse as a whole, which comprises a leaf spring 2, having a seat 3 secured thereto at its upper end, and being clamped at its lower end to a support generally designated by the numeral 4. A foot rest 5 is adjustably clamped to an intermediate part of the spring 2, and there is a handle-bar 6 extending through the head of the horse.

The support 4 consists of a pair of complementary tubular supporting members 7 and 8, each bent to form a forwardly directed bight 9 with a long straight ground engaging limb 10, extending rearwardly from the lower side of said bight and a short straight anchor limb 11 extending rearwardly from the upper side of said bight and upwardly divergent with respect to said lower limb.

Each member may be said to have a "fish hook" bend, in that the bight portion has an axial twist so that the short limb is laterally divergent with respect to the long limb. The bights of the respective members of the pair are oppositely twisted so that the short limbs diverge in opposite direction with respect to the long limbs.

Reference will now be had to Figure 14, which illustrates diagrammatically in plan, two alternative side by side positions of the members 7 and 8, said members being arranged with their long limbs parallel and the bights more or less upright. In the relative positions shown at a, in which member 7 is to the left of member 8, the short limbs 11 mutually converge toward their free ends. In position b, in which member 8 is to the left of member 7, the short limbs mutually diverge.

In the group of Figures 1 to 7, the member 7 is to the left of member 8. The short limbs 11 are brought into close adjacency with their axes parallel. This has thrown the long limbs 10 into a position of mutual divergence, as shown, defining a substantially triangular base of support, widest adjacent the seat, which is proper from the standpoint of stability.

The parallel short limbs 11 are clamped to the spring 2 by bolts 12, which pass through the spring and through underlying saddle clips 13, having curved ends which retain the anchor limbs 11. When the bolts are slightly loosened the limbs 11 are axially rotatable within the saddle clips, by means of which rotation the width adjustment of the base and the simultaneous height adjustment of the seat are effected.

In Figure 1, the short limbs have been equally rotated, that of member 7 clockwise, and that of member 8 counterclockwise so as to widen the angle between the respective bights and to increase the divergence of the limbs 10. Since the angle which the short limbs make with the ground plane decreases, the flatter the members 7 and 8 are turned, it follows that the seat will be lowered proportionately as the base of support is spread. A wide base of support and low seat adjustment is optimum for a small rider.

The concave sides of the bights 9 are each provided with a series of holes 14, the holes being correspondingly positioned for each bight. A tie bar 15, having hook ends 16 which are selectively interfittable in corresponding holes of each series, locks the supporting members 7 and 8 in several positions of adjustment, supplementing the clamping grip of the connection between said members and the spring.

Figure 4 shows the same hobby horse as Figure 1, adjusted for maximum height of seat and minimum width of supporting base. Here the short limbs 11 have been rotated in such direction as to bring the bights 9 into contact, preventing further adjustment in this direction.

Since Figures 1 and 4 suggest a stationary use of the apparatus, the ground engaging limbs 10 may be provided with yielding collars 17 of rubber or like material, which frictionally embrace them at four spaced points, two adjacent the seat and two forwardly. These protect the floor, and in the ordinary use of the hobby horse, keep it from creeping. However, a clever youngster can get an added movement out of the device by swaying forward and jerking back, which causes the hobby horse to advance across the floor in a series of steps. When this mode of locomotion is practiced, the protective function of the collars is all the more desirable. The collars may be shifted longitudinally of the limbs 10, to modify the amplitude of this stepping movement.

The group of Figures 8 to 13 illustrate the hobby horse with the side by side position of the members 7 and 8 reversed, that is, in the relative positions shown at b in Figure 14, but with the members rotated to bring the short limbs 11 into axial parallelism.

In this arrangement of the members 7 and 8, for any given angle of divergence of the long limbs 10, the angle between the bights will be wider than in the arrangement a, exemplified in Figures 1 and 4. Therefore, referring to Figure 8 in which the divergence of the long limbs 10 is the same as in Figure 1, since the bights are more inclined, the seat is not as high above the ground plane as in Figure 1. Thus, the side by side arrangement b of the supporting members permits a more stable ratio of seat height to base width than arrangement a.

Furthermore, in view of the wider angle between the bights, they will not come together as in Figure 4, and so put a limit to the narrowing adjustment of the base while the members 7 and 8 are yet divergent, but permit further rotation of the short arms 11 until the ground engaging limbs 10 are parallel, as shown in Figure 11, in which position the hobby horse may be used as a sled, the ground engaging limbs 10 serving as runners.

While I have in the above description disclosed what I believe to be a preferred and practical embodiment of the invention, it will be understood by those skilled in the art that the specific details of construction and arrangement of parts are by way of example and not to be construed as limiting the scope of the invention.

What I claim as my invention is:

1. Hobby horse comprising a pair of complementary rod-like supporting members, each bent to form a forwardly directed bight with a long ground engaging limb extending rearwardly from the lower side of said bight and a short anchor limb extending rearwardly from the upper side of said bight, upwardly and laterally divergent with respect to said lower limb, the short limbs of both supporting members being oppositely laterally diverted with reference to their long limbs, said supporting members being arranged side by side with their short limbs axially parallel and symmetrical with respect to a vertical plane parallel to the axes of the short limbs, a leaf spring, means for securing said short limbs to the lower end of said leaf spring, and a seat on said leaf spring.

2. Hobby horse as claimed in claim 1, said securing means being a clamping means permitting, when loosened, rotation of said supporting members about the axes of their short limbs.

3. Hobby horse as claimed in claim 1, said supporting means being reversably secured to said spring, with respect to their side by side relationship.

4. Hobby horse as claimed in claim 1, including spaced cushion members at fore and aft points on said long limbs.

5. Hobby horse as claimed in claim 1, the bight portions of said supporting members having series of correspondingly positioned holes, and a tie bar having hook ends selectively engageable in corresponding holes in said series.

6. Hobby horse comprising a pair of complementary rod-like supporting members each bent to form a forwardly directed bight with a long ground engaging limb extending rearwardly from the lower side of said bight and a short anchor limb extending rearwardly from the upper side of said bight, upwardly and laterally divergent with respect to said lower limb, the short limbs of both supporting members being oppositely laterally diverted with respect to their long limbs, said supporting members being arranged side by side with their short limbs axially parallel and symmetrical with respect to a vertical plane parallel to the axes of said short limbs, a leaf spring, clamp means securing said short limbs to the lower end of said leaf spring, when loosened, permitting rotation of said supporting members about the axes of said short limbs, providing a range of adjustment of said long limbs from positions of relative divergence to one of parallelism, and when tightened, fixing the adjustment, and a seat on said leaf spring.

ANDREW J. FLEURY.